United States Patent
Karchevsky et al.

(10) Patent No.: US 6,337,036 B1
(45) Date of Patent: Jan. 8, 2002

(54) CONDUCTIVE COMPOSITION HAVING SELF-EXTINGUISHING PROPERTIES

(75) Inventors: Valeria Karchevsky, Bat-Yam; Oleg Figovsky, Haifa; Freddy Romm, Migdal Emek; Olga Aksenov, Bat-Yam; Zahar Fiskin, Nesher; Anna But, Kyriat-Ata, all of (IL)

(73) Assignee: Amsil Ltd., Migdal Haemek (IL)

(*) Notice: Subject to any disclaimer, the term of this patent is extended or adjusted under 35 U.S.C. 154(b) by 0 days.

(21) Appl. No.: 09/501,140

(22) Filed: Feb. 9, 2000

Related U.S. Application Data

(63) Continuation-in-part of application No. 09/438,542, filed on Nov. 12, 1999.

(51) Int. Cl.$^7$ .............................. A01B 1/22; C09D 5/18
(52) U.S. Cl. ..................................... 252/512; 106/18.12
(58) Field of Search ................................ 252/511, 512, 252/513, 514, 601, 604, 610; 106/18.12

(56) References Cited

U.S. PATENT DOCUMENTS

| | | | |
|---|---|---|---|
| 3,632,440 A | 1/1972 | Preston ........................ | 117/218 |
| 4,136,238 A * | 1/1979 | Hilterhaus et al. ........... | 521/107 |
| 4,692,272 A * | 9/1987 | Goswami et al. ............ | 252/514 |
| 5,021,005 A | 6/1991 | Slenker ....................... | 439/421 |
| 5,318,724 A * | 6/1994 | Hasegawa et al. ........... | 252/518 |
| 5,484,294 A | 1/1996 | Sobhani ........................ | 439/21 |
| 5,494,610 A * | 2/1996 | Lovell ......................... | 252/511 |
| 5,582,769 A * | 12/1996 | Lovell ......................... | 252/508 |
| 5,688,441 A * | 11/1997 | Itagaki et al. ................ | 252/514 |
| 5,728,332 A | 3/1998 | Frisch et al. ................ | 264/46.4 |

FOREIGN PATENT DOCUMENTS

WO     WO 9741568     6/1997

OTHER PUBLICATIONS

Standard Test Methods for DC Resistance or Conductance of Insulating Materials, Designation D 257–93—pp. 108–124 No Pub Date.

Standard Test Method for Cohesion/Adhesion of Sprayed Fire–Resistive Materials Applied to Structural Members, Designation: E 736–92—pp. 691–692, No Publ Date.

Standard Test Methods for Fire Tests of Building Construction and Materials, Designation E 119–95a—pp. 436–445, No Pub. Date.

Standard Test Methods for Measuring Adhesion by Tape Test, Designation D 3359–93—pp. 433–438.

Standard Test Methods for Evaluating Coatings for High Temperature Service, Designation D 2485–91—pp. 329–330, No Pub. Date.

Standard Test Method for Bond Strength of Epoxy–Resin Systems Used with Concrete by Slant Shear, Designation: C 882–91—pp. 449–451, No Pub. Date.

Standard Specification for Glass Fiber Blanket Insulation (Aircraft Type), Designation C 800–92—pp. 400–404, No Pub. Date.

Standard Test Method for Tensile Properties of Adhesive Bonds, Designation D 897–95—pp. 8–10, No Pub. Date.

Standard Test Method for Impact Strength of Adhesive Bonds, Designation D 950–94—pp. 39–43, No Pub. Date.

Standard Test Method for Fire Retardancy of Paints (Cabinet Method, Designation: D 1360—90a—pp. 190–192, No Pub. Date.

* cited by examiner

*Primary Examiner*—Mark Kopec
(74) *Attorney, Agent, or Firm*—Blank Rome Comisky & McCauley LLP

(57) ABSTRACT

A composition is disclosed for use as a conductive coating for applying to various substrates. The composition has a particulate conductive component and temperature resistant component. The temperature resistant component contains an organic-mineral compound. The molar ratio of the conductive component to the temperature resistant component is (15–45):1, and the temperature resistant component is an aqueous solution of quaternary ammonium silicate having a silicate modulus of at least 4 and containing organic radicals with at least four atoms of carbon.

8 Claims, No Drawings

CONDUCTIVE COMPOSITION HAVING SELF-EXTINGUISHING PROPERTIES

This application is a Continuation-in-part (CIP) of application Ser. No. 09/438,542 filed on Nov. 12, 1999 allowed.

FIELD OF THE INVENTION

The proposed invention refers to a polymeric composition suitable to adhere and coat different substrates and to conductive coatings prepared from this composition. More particularly the invention refers to a composition having improved temperature resistance and rendering the coating flame-retardant without however deteriorating its conductive and adhesion properties, Conductive temperature-resistant coatings prepared from the composition of the present invention can be used in various applications including military applications, electronic industry, space applications, measuring equipment operating at high temperatures, e.g. measuring data of volcanic lava, heating equipment, fire simulators, etc.

BACKGROUND OF THE INVENTION

Conductive polymeric compositions are commonly used for coating of various flat and curved substrates, e.g. heating elements, integrated circuit boards used for carrying electronic components etc.

The main ingredients of a mixture used for preparation of such coatings comprise a component capable to provide conductivity and a binder component.

Polymeric conductive coatings and their various applications are described for example in U.S. Pat. No. 5,484,294, 3,632,440, 5,021,005, WO 9741568.

An example of typical polymeric composition used for preparation of conductive coating can be found in U.S. Pat. No. 5,728,332 disclosing an electrically conductive polymeric coating paste. This composition includes an aromatic solvent, a particulate capable to provide conductivity, a substrate forming elastomer and paraffin, One typical disadvantage associated with prior art polymeric conductive coatings are their insufficient resistance to high-temperatures and thus limited service life. Practically, most of the prior art coatings, including the above-mentioned conductive polymeric coating paste function properly only at temperatures in the range of 200–400° C. At higher temperatures, the prior art coatings deteriorate fast because of oxidation in air and subsequently loose their conductive properties.

SUMMARY OF THE INVENTION

The main object of the present invention is to improve temperature resistance of polymeric conductive coatings, without however deterioration of their conductive properties.

Still further object of the invention is to provide a polymeric conductive coatings, having improved fire resistance and capable to function at temperatures higher than 400° C.

Yet, another object of the invention is to provide a polymeric conductive coating having improved temperature resistance without substantial increase of cost of its composition.

The above mentioned and other objects of the invention are achieved by virtue of combination of a particulate conductive component with a liquid temperature-resistant component.

It has been unexpectedly revealed that it is very advantageous to use for as temperature resistant component an organic-mineral compound, namely quaternary ammonium silicate (QAS) with modulus 4 or higher. In accordance with the invention, it is important that the ingredients of the composition are thoroughly mixed to obtain a mixture, which does not exhibit sedimentation. In practice, it is advantageous if the particle size of the particulate component does not exceed 100 mesh and does not exceed half of the thickness of the coating layer to be applied to a substrate. The most efficient results in terms of combination of good conductivity and improved temperature resistance are achieved if the conductive component is an amphoteric metal. Possible reason for this could be chemical reaction of amphoteric metal with quaternary ammonium silicate. The product of this reaction is a salt that increases the active surface of the conductive component and renders the coating even more fire-retardant.

It should be also appreciated that besides of the above components the composition may contain some other additives, which usually are required to impart specific properties to the coating. Among such additives can be mentioned fillers, pigments, etc. It is possible to use known commercially available inorganic metallic or non-metallic fillers, e.g. nickel, cobalt, iron, graphite, etc. As suitable pigment, one can use titanium dioxide, iron oxide, chromium oxide, etc.

It has been also found that polymeric conductive coatings of the invention are most suitable for applying on heating elements when their conductivity is relatively low and for applying on electronic circuit boards when their conductivity is relatively high.

DETAILED DESCRIPTION OF THE PREFERRED EMBODIMENTS

With reference to non-limiting examples 1–25 and Table 1 presented below the invention will be described now in more details.

The following ASTM standards were used for characterization of electrical, adhesive and fire-resistance properties of conductive coatings applied to substrates made of concrete, steel and ceramics: C800-94, C882-91, D4541-93, D3359-93, D 257-93, D2485-91, D1360-90a, D897-95, D950-94, D1360-90a, E119-95a, E736-92.

Temperature resistance was defined as a temperature at which conductive properties and/or adhesion to the substrate were lost.

Makfar Co. (Haifa, Israel) measured electric conductivity. In these measurements, the voltage and current were measured on a chain of 10 apparatuses TES 6210, connected in series and providing total voltage 315 V. Current error measurement was 0.01 A.

EXAMPLE 1

55 weight % of conductive component, namely aluminum powder with particle size less than 325 mesh (Manufacturer Atlantic Equipment Engineers AEE, USA) was mixed with 45 mass. % of temperature resistant component, namely aqueous solution of tetrabutyl-ammonium-silicate, having modulus 7. The above mass percentage is equal to molar ratio 32:1

An aqueous solution of tetrabutyl ammonium silicate was prepared beforehand for example as described in a monograph "Liquid and soluble glass" by V. I. Korneev and V. V. Danilov, Stroyisdat, 1996, pp. 84, 85.

It is advantageous to use quaternary ammonium silicate containing large organic radicals with at least four atoms of carbon. Coatings in which were employed QAS with smaller radicals exhibited crack formation during drying.

The ready for use tertabutyl-ammonium-silicate will be referred-to further as TBAS.

The obtained low-viscosity composition was applied to various metallic and non-metallic substrates by brush and coated samples were dried at room temperature (25° C.) for 24 hours. The coating thickness after drying was about 100 microns.

After drying the samples were heat treated according to the following schedule: temperature was raised during 2.5 hours up to 150° C. and then during 45 minutes to 670° C.

The coating exhibited excellent conductive, fire/thermal-resistance and adhesive properties irrespective of the substrate material. Temperature resistance was better than 800° C.

EXAMPLE 2

The same as in Example 1, but samples were heated up to 500° C. only. Electrical conductivity decreased 10 times.

EXAMPLE 3

The same as in Example 1, but the molar ratio of conductive component to temperature resistant component was 40:1. Temperature resistance decreased to 700° C.

EXAMPLE 4

The same as in Example 1, but the molar ratio of conductive component to temperature resistant component was 24:1. Temperature resistance decreased to 700° C.

EXAMPLE 5

The same as in Example 1, but the molar ratio of conductive component to temperature resistant component was 20:1. Conductivity decreased by 50–100 times, temperature resistance reduced to 600° C., adhesion to steel reduced.

EXAMPLE 6

The same as in Example 1, but the molar ratio of conductive component to temperature resistant component was 45:1. Adhesion is lost.

EXAMPLE 7

The same as in Example 1, but instead of aluminum powder zinc powder with particle size less than 200 mesh was used (Manufacturer AEE, USA). The molar ratio of conductive component to fire resistant component was 32:1. The samples were heated to 650° C. Conductivity is good.

EXAMPLE 8

The same as in Example 1, but the samples were not heated after drying. Conductivity is reasonable.

EXAMPLE 9

The same as in Example 1, but tetrabutyl-ammonium-silicate with modulus of 10 was used. Conductivity is excellent.

EXAMPLE 10

The same as in Example 1. but tetrabutyl-ammonium-silicate with modulus of four was used. Conductivity is excellent, temperature resistance and adhesion decreased.

EXAMPLE 11

The same as in Example 1. but tetrabutyl-ammonium-silicate with modulus of 3 was used. Properties are lost.

EXAMPLE 12

The same as in Example 1, but instead of tetrabutyl-ammonium-silicate stable solution of sodium silicate with modulus of 3 was used. Properties are lost.

EXAMPLE 13

The same as in Example 1, but aluminum powder is partly replaced by iron powder having particle size of less than 100 mesh (Manufacturer AEE, USA). The coating thickness was about 200 $\mu$m, and the molar ratio of iron powder to aluminum powder and to temperature resistant component was 10:6:1. Conductivity is excellent, and properties are kept up to 1,000° C.

EXAMPLE 14

The same as in Example 1, but aluminum powder was fully replaced by iron powder, and molar ratio of conductive component to temperature resistant component was 6:1. The samples were heated to 650° C. There was no conductivity observed.

EXAMPLE 15

The same as in Example 14, but molar ratio of conductive component to temperature resistant component was 32:1. Coating could not be prepared.

EXAMPLE 16

The same as in Example 1, but aluminum powder was partly replaced by titanium powder, having particle size of less than 200 mesh (Manufacturer AEE, USA) The total molar ratio of conductive component to temperature resistant component was 15:1. Conductivity is excellent, and properties kept up to 1,000° C.

EXAMPLE 17

The same as in Example 1, but aluminum powder was fully replaced by titanium powder and molar ratio of conductive component to temperature resistant component was 30: 1. The samples were heated to 650° C. Conductivity is excellent.

EXAMPLE 18

The same as in Example 1, but aluminum powder was partly replaced by graphite powder having particle size of less than 325 mesh (Manufacturer Asburt Graphite of California, USA). The total molar ratio of conductive component to temperature resistance component was 6:1. Conductivity is good.

EXAMPLE 19

The same as in Example 1, but aluminum powder was partly replaced by chromium oxide (III) powder having particle size of less than 325 mesh (Manufacturer Cerac Inc. USA). The total molar ratio of conductive component to temperature resistance component was 0.4:1. Conductivity is excellent.

EXAMPLE 20

The same as in Example 1, but tetramethyl-ammonium-silicate was used instead of tetrabutyl-ammonium-silicate. Coating cracked, and conductivity is lost.

EXAMPLE 21

The same as in Example 1, but tetraethyl-ammonium-silicate was used instead of tetrabutyl-ammonium-silicate. Coating cracked, and conductivity is lost.

EXAMPLE 22

The same as in Example 1, but tetrapropyl-ammonium-silicate was used instead of tetrabutyl-ammonium-silicate. Coating cracked, and conductivity is lost.

EXAMPLE 23

The same as in Example 1, but tetrapentyl-ammonium-silicate was used instead of tetrabutyl-ammonium-silicate. All properties are very good.

EXAMPLE 24

The same as in Example 1, but aluminum powder with particle size of less than 300 mesh was used (Manufacturer AEE, USA). The particle size exceeded the coating thickness. The coating could not be spread homogeneously and adhesion was very bad.

EXAMPLE 25

The same as in Example 24, but the thickness of the coating was about 250 μm. The coating could not be spread homogeneously and adhesion was very bad.

The properties of the composition prepared in accordance with the above examples are summarized in non-limiting Table 1 below.

The abbreviations used in Table 1 are:

A1—resistance, Ω×cm;

A2—temperature at which conductive properties arc lost or coating did not sustain any more, A3—adhesion to concrete, MPa;

A4—adhesion to steel, MPa;

A5—adhesion to ceramics, MPa, m—silicate modulus of quaternary-ammonium-silicate;

TMAS—tetramethyl-ammonium-silicate

TEAS—tetraethyl-ammonium-silicate

TPrAS—tetrapropyl-ammonium-silicate

TBAS—tetrabutyl-ammonium-silicate

TPeAS—tetrapentyl-ammonium-silicate x—no property exhibited (*) no heating during sample preparation (**) particle size of the conductive component exceeds thickness of the coating

TABLE 1

| N. Composition | m | A1 | A2 | A3 | A4 | A5 |
|---|---|---|---|---|---|---|
| 1. TBAS/Al = 1/32 | 7 | 10 | >800 | 2.5 | 5 | 3 |
| 2. TBAS/Al = 1/32(*) | 7 | 100 | >800 | 2.5 | 5 | 3 |
| 3. TBAS/Al = 1/40 | 7 | 10 | 700 | 1.5 | 3.5 | 1.5 |
| 4. TBAS/Al = 1/24 | 7 | 200 | 700 | 2 | 4 | 2 |
| 5. TBAS/Al = 1/20 | 7 | 500–1000 | >600 | 2.5 | 1.5 | 2.5 |
| 6. TBAS/Al = 1/45 | 7 | <1 | — | <0.5 | <1 | <0.5 |
| 7. TBAS/Zn = 1/32 | 7 | 20 | >800 | 2 | 4 | 2.5 |
| 8. TBAS/Zn = 1/32(*) | 7 | 500 | >800 | 2 | 4 | 2.5 |
| 9. TBAS/Al = 1/32 | 10 | 10 | >800 | 2.5 | 5 | 3 |
| 10. TBAS/Al = 1/32 | 4 | 10 | 600 | 1.5 | 3 | 2 |
| 11. TBAS/Al = 1/32 | 3 | >1000 | — | 0.5 | 1 | 0.5 |
| 12. Na$_2$O/SiO$_2$/Al = 1/3/32 | 3 | 4 × 10$^4$ | 2.5 | 5 | 3 | |
| 13. TBAS/Al/Fe = 1/6/10 | 7 | 1 | 1000 | 2.5 | 5 | 3 |
| 14. TBAS/Fe = 1/16 | 7 | 1 | 300 | 1.5 | 4 | 2 |
| 15. TBAS/Fe = 1/32 | 7 | no coating | | | | |
| 16. TBAS/Al/Ti = 1/8/7 | 7 | 1 | 1000 | 2.5 | 5 | 3 |
| 17. TBAS/Ti = 1/30 | 7 | 1.5 | >800 | 2.5 | 5 | 3 |
| 18. TBAS/Al/graphite = 1/32/6 | 7 | 30 | >800 | 1.5 | 3 | 2 |
| 19. TBAS/Al/Cr$_2$O$_3$ = 1/21/0.4 | 7 | 1.4 | >800 | 2.5 | 4 | 2.5 |
| 20. TMAS/Al = 1/32 | 7 | coating cracked | | | | |
| 21. TEAS/Al = 1/32 | 7 | coating cracked | | | | |
| 22. TPrAS/Al = 1/32 | 7 | coating cracked | | | | |
| 23. TPeAS/Al = 1/32 | 7 | 10 | >800 | 2.5 | 5 | 3 |
| 24. TBAS/Al = 1/16(**) | 7 | no coating obtained | | | | |
| 25. TBAS/Al = 1/16(**) | 7 | no coating obtained A1 | | | — | |

It is obvious from the data presented in Table 1 that:
1) Compositions containing quaternary ammonium silicate (QAS) with metals (Al, Zn, Fe, Ti) in several molar proportion exhibit combination of excellent or good conductive and adhesive properties holding up to 300–1000° C. (examples 1, 2, 3, 4, 7, 9, 10, 13, 16, 17, 18, 19, 23). Compositions with resistance 20Ω can be used in all applications except heating elements. The other compositions can be recommended for heating elements. If the amount of conductive component is reduced below or is kept above certain amount the useful properties are lost (examples 5, 6, 7).
2) Coatings with amphoteric metals (Al, Zn, Ti) exhibit better performances than the rest of samples (compare examples 1, 7, 17 to 14).
3) Coatings with QAS having organic radicals with 4 carbonic atoms and more exhibit better performances than coatings with QAS with less than 4 organic radicals (compare examples 1, 23 to 20, 21, 22).
4) Coatings with QAS with modulus 4 or more exhibit better performances than QAS with modulus less than 4 (compare examples 1, 9, 10 to 13, 14).
5) Metal particle size should be kept less than half of coating thickness (compare examples 1 and 24).
6) Addition of filler enables to modify performances and to achieve required conductivity (examples 13, 16, 18, 19).
7) Aluminum enables to achieve the best combination of conductivity and other properties.

It should be appreciated that the present invention is not limited to the above-described embodiments and that one skilled in the art can make changes and modifications without deviation from the scope of the invention, as will be defined in the appended claims.

It should also be appreciated that the features disclosed in the foregoing description, and/or in the following claims, and/or in the accompanying examples and /or in the accompanying tables, both separately and in any combination thereof, be material for realizing the present invention in diverse forms thereof.

What is claimed is:

1. A composition for use as a conductive coating for applying to various substrates, said composition comprising particulate conductive component and temperature resistant component, which comprises an organic-mineral compound wherein the molar ratio of the conductive component to the temperature resistant component is (15–45):1 and wherein said temperature resistant component is an aqueous solution of quarternary ammonium silicate having silicate modulus of at least 4 and containing organic radicals with at least four atoms of carbon.

2. The composition as defined in claim 1, in which said particulate conductive component has particle size of not more than 100 mesh.

3. The composition as claimed in claim 2, in which said conductive component contains at least one non-metallic additive.

4. The composition as defined in claim 2, said composition contains 32 mol of aluminum powder with particle size of not more than 325 mesh and 1 mol of tetra-butyl-ammonium-silicate with silicate modulus of 7.

5. The composition as defined in claim 1, in which said conductive component is a metal selected from the group consisting of Zn, Al, Fe, Ti or their combinations.

6. The composition as defined in claim 1, in which said organic mineral compound is selected from the group consisting of tetra-methyl-ammonium-silicate, tetraethyl-ammonium-silicate, tetra-propyl-ammonium-silicate, tetra-butyl-ammonium-silicate, tetra-pentyl-ammonium-silicate or their combinations.

7. A conductive coating made from the composition of claim 1.

8. The conductive coating as defined in claim 7, which composition contains 32 mol of aluminum powder with particle size of not more than 325 mesh and 1 mol of tetra-butyl-ammonium-silicate with silicate modulus 4.

* * * * *